Nov. 24, 1964  G. SCHLIPPHAK  3,157,910
PRESSING ROAD FOR PRESSING PLATES ON SUPPORT SHEETS
Filed Sept. 15, 1961  2 Sheets-Sheet 2
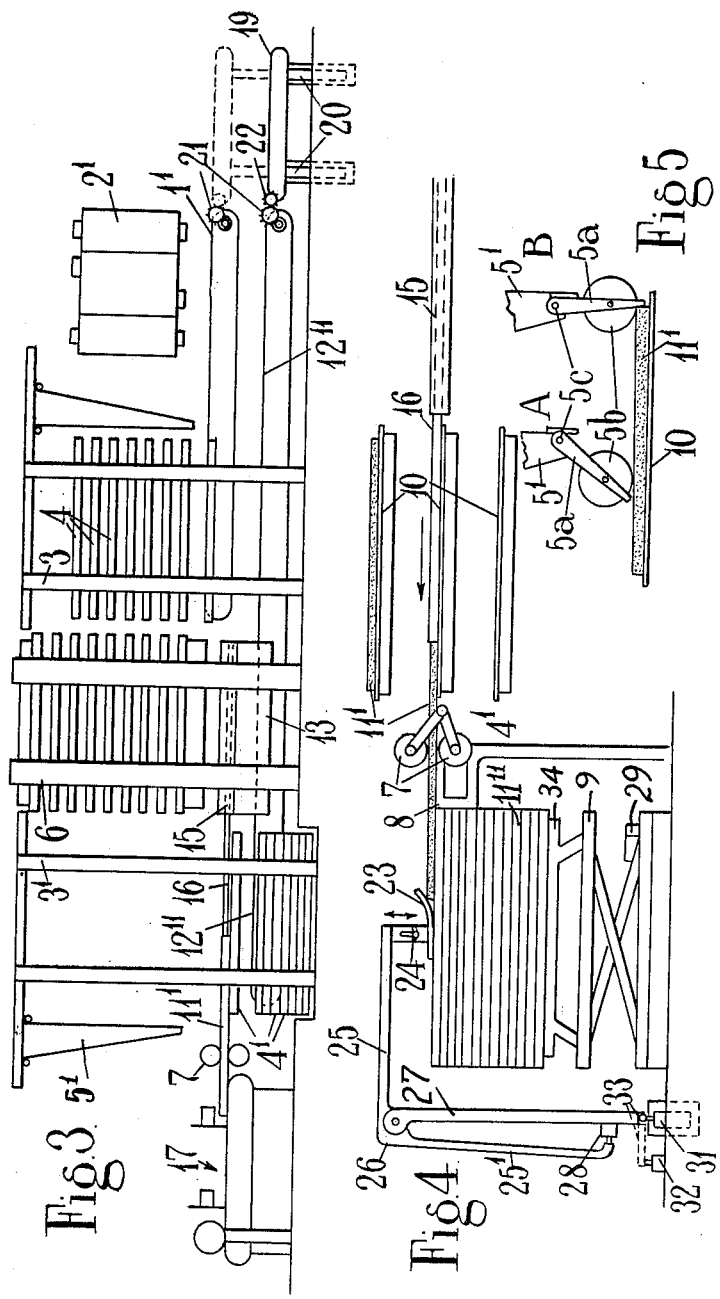

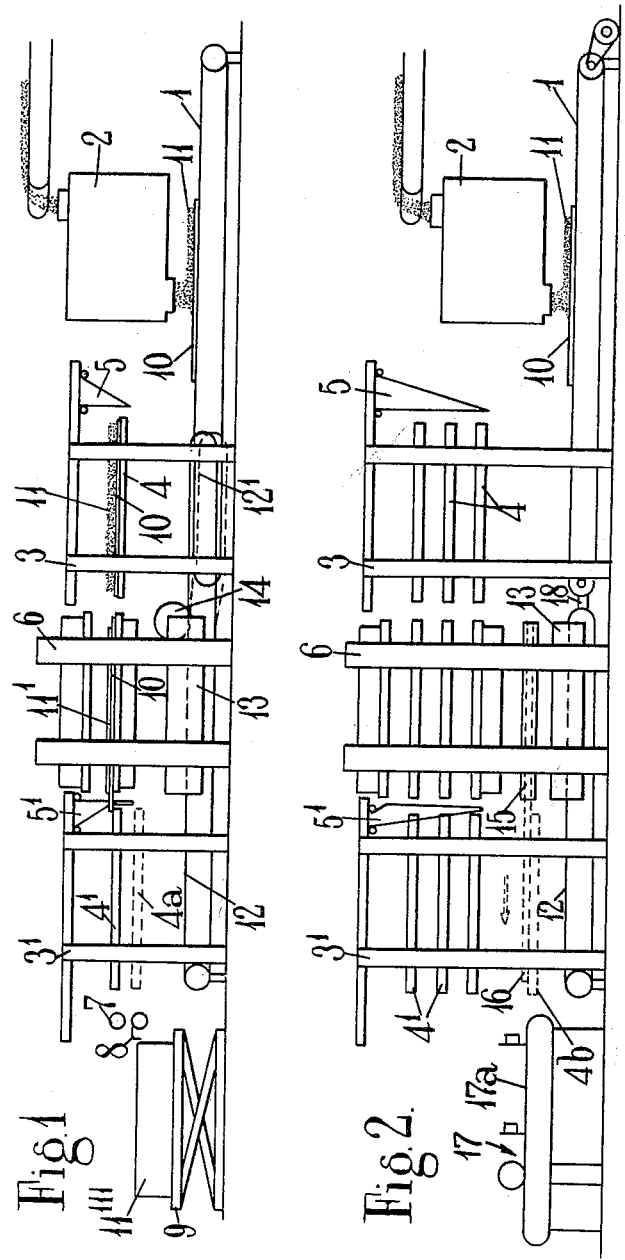

ID 1

3,157,910
PRESSING ROAD FOR PRESSING PLATES ON SUPPORT SHEETS
Gerhard Schlipphak, Munich, Germany, assignor to Horst Gerlach, Munich, Germany
Filed Sept. 15, 1961, Ser. No. 138,473
1 Claim. (Cl. 18—4)

The present invention relates to a pressing road for pressing plates on support sheets, and more particularly plates of plywood, chipboard and the like.

One object of the invention is to make a pressing apparatus which is economical in its use of space.

The apparatus for making pressed components by pressing material on to support plates according to the invention comprises a series of support plates, a device for feeding components-forming material on the plates sequentially, a press, a conveyor for moving the plates loaded with the material to the press, means for removing the pressed components from the support plates, and means for conveying the support plates from the component-removing means under the press to the material feeding device.

The accompanying drawing shows several embodiments of the pressing apparatus of the invention. In the drawings:

FIG. 1 is a diagram of a single stage plant with loading in reciprocating movement, with overlapping return and feeding conveyors;

FIG. 2 is a diagram of a pressing road similar to FIG. 1, but of a three-stage press with detachable coupling;

FIG. 3 is a multi-stage plant with the return conveyor passing underneath the feeding conveyor;

FIG. 4 is a separating device with stacking device;

FIG. 5 is a design of an extension piece on the discharge or unloading arm with single-stage plants.

In the single-stage plant of FIG. 1, a support plate 10 is on the feeding conveyor 1, moving at this moment towards the right, and receiving from the feeding device 2 glued chip material 11 for the manufacture of chip brand. When the support plate 10 arrives at the right-hand terminal position of the feeding conveyor 1, the latter changes its direction, and the support plate, which is now moving towards the left, receives during its second passage a further layer of chips until these reach their full starting level. The stage 4 of the charging device 3 is shown in the forward position. It holds a plate 10 with a chip layer ready for pressing. The press 6 is open, and holds, on a support plate 10 a finished pressed component 11'. The extractor arm 5' of the unloading device 3' is shown in its extended position, that is, it is in contact with the support plate 10 in the press, in order to pull the latter out of the press 6 into the stage 4' of the unloading device 3', while simultaneously the loading arm 5 of the loading device 3 pushes the support plate 10 from the loading device 3 into the press 6. The support plate 10 with the finished pressed component 11 now in the unloading device 3' is then lowered to the position 4a shown in FIG. 1 by the broken lines so that the extractor arm 5' which is now on the left hand side, can now move from the left to the right, as shown in FIG. 5, into position A. Its end has an extension piece 5a with a roller 5b, articulated at 5c on the end of arm 5'. When the extractor arm 5' has pulled the plate out of the press, and is therefore, in FIG. 1, at the left end of the unloading device 3', stage 4' drops into the dotted position 4a. The unloading arm 5' moves now again towards the right, whilst the extension piece 5a is lifted and the roller 5b rolls over the pressed body. The extractor arm 5' changes its movement, before it reaches its starting position but, as shown in FIG. 5, B, after the extension piece 5a has dropped into the separating position, in which its lower end which maintains a certain distance from the support plate 10, can engage the pressed part 11' and push it towards the left off the plate.

In this embodiment, the pressed component is taken up during the separation by the transfer rollers 7, whose surface speed is the same as that of the component, and transported for stacking to the stack 11''', 8 denotes a support bracket to the left of rollers 7.

Meanwhile, the stage 4' has dropped so far that the now empty support plate 10 is transferred to the return conveyor 12. On this it enters into a cooling device 13, where it remains for a certain time, during which it is cooled by fresh air supplied by the fan 14. Thus the empty support plate has left the unloading device 3' in the opposite direction to that in which it entered. The cooling device 13 is fitted immediately below the press 6. Under the charging device 3, the return conveyor 12 and the feeding conveyor 1 overlap. This is shown in FIG. 1 in a position, in which the lowerable return conveyor 12 is shown in its upper position, in which it can carry a support plate, coming from the left side, over the feeding conveyor. Then it is lowered into the position 12', shown by dotted outlines. In this position it is below the level of the feeding conveyor 1, which takes the support plate and caries it to the right to a position for receiving a new charge as already described. The return conveyor 12 remains in the lowered position until the recharged support plate 10 has left the charging position and has been moved into the charging position by the stage 4 of the loading device 3.

The operation of the three-stage plant of FIG. 2 corresponds, in principle, to that described above. It differs in that it has a separating device 15, a sawing device 17 and different means for the transfer of an empty plate 10 from the return conveyor 12 to the feeding conveyor 1. Also this plant is shown in loading position, that is, the devices 3 and 3' are in the raised position and the press 6 is open. For the sake of clarity the support plates 10 in the loading device 3 and the press 6 are not shown. The press 6 differs from that shown in FIGURE 1 in being a multi-stage press capable of pressing several components during one stroke. When the extractor arm 5' has withdrawn the support plates with the finished pressed components from the press 6, the lowest stage of the unloading device 3' is first lowered into the position 4b, shown by dotted outlines. When this ram is reached, a separating piston 16, moving from the separating device 15 towards the left, pushes the pressed component from the support plate towards the left, so that it shifts on to the conveyor 17a of the sawing device 17, which trims all four sides; then it moves on towards the left. In order to separate the next pressed component from its support plate the stages of the unloading device 3' are again lowered by one stage, so that the ram 16, having returned to its starting position, can now again separate the next pressed component from its support plate. Preferably, separating ram 16 is automatically locked in such a way that it can push a plate towards the left only, when the saws of the device 17 are free. The empty support plates are transferred by the unloading device 3' to the return conveyor 12 and are carried to the cooling device 13. In this embodiment, return conveyor 12 and feeding conveyor 1 are separate and may be connected only by means of a detachable coupling 18. The drive is applied preferably to the feeding conveyor 1. The coupling 18 causes the return conveyor to be driven only when feeding conveyor 1 moves to the right. During the reverse movement of the conveyor 1 the return conveyor 12 with the support plate in the cooling device is not moved.

FIG. 3 shows a pressing road for a six-stage press. The feeding device 2' consists of several sheets under which the feeding conveyor 1' in this embodiment moves only in one direction, namely towards the left. The charging of the support plates with material is effected as known per se and as described in conjunction with FIG. 2. The plant is shown in a position in which the last stage of the changing device 3 is at the level of the feeding device, in order to be lifted into loading position after introduction of the last support plate. The last stage 4' of the unloading device 3' is at the level of the separating device 15, the ram 16 of which separates a pressed component from its plate so that the plate is fed to the sawing device 17 by means of transfer rollers 7 for the sake of clarity, the stages of the press 6, which are still closed at the time, are here shown in the open position. The return conveyor 12' runs from the unloading device 3', under the press, the loading device and the feeding conveyor 1'. At the end of the return conveyor 12" (right-hand side) the empty plate passes to a lifting device 19, whereby it is lifted by the members 20 to the level of the feeding device 1', as shown by the dotted line. The return conveyor 12" and the feeding conveyor 1' have, at their right hand ends, gear combinations 21 for engaging gear 22 of the lifting device 19 in its top and bottom position. This gear 22, being thus driven by the return conveyor and feeding conveyor drives a conveyor in the lifting arrangement 19 in the same sense of rotation in order to place the support plate 10 on the lifting arrangement or withdraw this plate from the lifting arrangement.

FIG. 4 shows an automatic stacking device, such as may follow in this pressing road either after the unloading device or after the sawing device 17. FIG. 4 shows the first case. The ram 16 has passed from the separating device 15 towards the left, until the pressed component 11' has left the stage 4' of the unloading device almost entirely. It is now seized by the transfer rollers 7, the gap between which is adjustable, and moved forward at the same speed as that of ram 16. Its leading edge is just in contact with a vertically movable feeler 23 which pushes, during the continued movement to the left of the pressed component, the arm 25 of the angle lever 26 upwards, causing pressure arm 25' to move towards the column 27, operating switch 28. This switch 28 actuates the drive 29 of the table 9, causing it to be lowered, and maintains this drive in operation until feeler 23 resumes its normal position. The stack 11' is therefore lowered by the thickness of the pressed component. Between the feeler 23 and the arm 25, there are adjusting means 24, for example a winged nut with oblong slot. Behind the transfer rollers 7, there is, substantially on the same level as the separating plane, a support bracket 8. When the pressed component 11" has passed through the transfer rollers 7, its trailing edge remains on this support bracket 8. The next pressed component then abuts with its leading edge against the trailing edge of the pressed component 11" on the support bracket 8, causing it to drop over the edge of the bracket. The following pressed component can now slide over the lower pressed component. This arrangement of the support bracket ensures that all trailing edges of all pressed components 11" are exactly aligned.

The column 27 of the height adjustment device may be swivelled laterally about its base. It is equipped with a switching pin 33, which operates, according to its position, either switch 31 or 32. If a finished stack 11" is to be removed from the lifting table, for example by means of a fork lift truck, the arm 25 is swivelled out by about 90° with the column 27 enabling the stack to be lifted. This rotation motion causes also the switching pin 33 to rotate, so that it actuates switch 32, causing the drive 29 of table 9 to lower the stack as far as possible. When the stack has been removed and the table provided with a new plate 34, the arm is turned back into its original position. This causes switch 31 to be operated, so that the drive 29 of table 9 raises this table again into its starting position for receiving the first pressed component 11' for a new stack 11".

The drawings show only a few of a large number of pressing roads which may be equipped according to the present invention. Such pressing roads save a great amount of space and may be easily supervised. Apart from an operator who switches the plant on and supervises it, they require no further operating personnel and make possible the fully automatic production up to and including the final cutting to size, so that only the stack must be removed by the staff. The embodiments of the drawings show feeding arrangements 2 for applying chipped material. However, these may also be replaced by arrangements for veneers, or for the application of veneers to chipboard, or for veneers with intermediate layers of rods.

What I claim is:

In a plant for the production of plates of pressed material such as plywood, chipboard and the like plates in which such pressed plates are formed on support plates moved in a closed cycle through the plant, and in which said plant includes a press structure comprising a press for receiving the support plates carrying the material to be pressed and for pressing said material into pressed plates, a feeding device located at one side of the press structure for receiving support plates carrying material to be pressed from an adjacent material supply device and for feeding them into the press, a discharge device on the side of the press opposite the feeding device for receiving support plates carrying plates of pressed material from the press, means for separating the plates of pressed material from the support plates at the discharge device, and conveyor means for receiving and returning the support plates from the discharge device to the device for supplying material to the support plates, the improvement including a cooling device located in the press structure below the press proper, and in which said conveyor means comprises a first conveyor extending from the cooling device to the press feeding device and the material supply device, for receiving the support plates from the cooling device and conveying said cooled support plates first to the material supply device and then for moving the support plates having material thereon to the press feeding device, a second conveyor extending from the press discharge device through the cooling device for receiving plates from said discharge device and conveying them to the cooling device, and means for detachably coupling said first and second conveyors whereby the second conveyor is immobile, with a support plate thereon in the cooling device while the first conveyor is charging a support plate from the material supply device and returning said plate to said press feeding device.

References Cited in the file of this patent

UNITED STATES PATENTS

| | | |
|---|---|---|
| 2,556,754 | Geist | June 12, 1951 |
| 2,618,813 | Patton et al. | Nov. 25, 1952 |
| 2,692,418 | Besser | Oct. 26, 1954 |
| 2,831,213 | Klarmann et al. | Apr. 22, 1958 |
| 2,878,728 | Clark | Mar. 24, 1959 |
| 3,019,478 | Erickson et al. | Feb. 6, 1962 |

FOREIGN PATENTS

| | | |
|---|---|---|
| 815,442 | Great Britain | June 24, 1959 |